United States Patent
Minadeo (10) Patent No.: US 9,188,107 B2
(45) Date of Patent: Nov. 17, 2015

(54) WIND TURBINE BEARINGS

(71) Applicant: General Electric Company, Schenectady, NY (US)

(72) Inventor: Adam Daniel Minadeo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 19 days.

(21) Appl. No.: 14/014,695

(22) Filed: Aug. 30, 2013

(65) Prior Publication Data

US 2015/0063736 A1 Mar. 5, 2015

(51) Int. Cl.
| | | |
|---|---|---|
| *F16C 19/08* | (2006.01) | |
| *F16C 33/58* | (2006.01) | |
| *F03D 11/00* | (2006.01) | |
| *F16C 33/60* | (2006.01) | |
| *F03D 7/02* | (2006.01) | |

(52) U.S. Cl.
CPC .......... *F03D 11/0008* (2013.01); *F03D 7/0224* (2013.01); *F16C 19/08* (2013.01); *F16C 33/585* (2013.01); *F16C 33/60* (2013.01); *F05B 2260/79* (2013.01)

(58) Field of Classification Search
CPC .......... F16C 19/02; F16C 19/04; F16C 19/08; F16C 19/14; F16C 19/18; F16C 19/181–19/183; F16C 2360/31; F16C 33/585; F16C 33/60; F03D 11/0008; F03D 7/0224; F05B 2260/79
USPC ........................................................ 384/514
See application file for complete search history.

(56) References Cited

U.S. PATENT DOCUMENTS

| | | | | | |
|---|---|---|---|---|---|
| 613,712 | A | * | 11/1898 | Parkin | 384/477 |
| 1,375,019 | A | * | 4/1921 | Sellew | 384/516 |
| RE15,233 | E | * | 11/1921 | Sellew | 384/504 |
| 2,650,864 | A | * | 9/1953 | Mergen | 384/512 |
| 3,814,488 | A | * | 6/1974 | Rood | 384/613 |
| 3,986,754 | A | * | 10/1976 | Torrant | 384/504 |
| 4,223,961 | A | * | 9/1980 | Martinez | 384/452 |

(Continued)

FOREIGN PATENT DOCUMENTS

| | | |
|---|---|---|
| CN | 201487047 U | 5/2010 |
| DE | 102012002203 A1 | 8/2013 |

(Continued)

OTHER PUBLICATIONS

IMO Energy GmbH & Co. KG., available at energy@imo.de (Next Level PITCH Bearing—Design Types).

(Continued)

*Primary Examiner* — Alan B Waits
(74) *Attorney, Agent, or Firm* — Dority & Manning, P.A.

(57) ABSTRACT

In one aspect, a pitch bearing for coupling a rotor blade to a hub of a wind turbine may include an outer race defining a first outer raceway wall. The first outer raceway wall may define a center of curvature. The pitch bearing may also include an inner race defining a first inner raceway wall. The first inner raceway wall may define a center of curvature. In addition, the pitch bearing may include a plurality of roller elements disposed between the first inner and outer raceway walls. Each roller element may define a geometric center. Moreover, the center of curvature for each of the raceway walls may be offset from the geometric center of each roller element.

20 Claims, 11 Drawing Sheets

(56) References Cited

U.S. PATENT DOCUMENTS

| | | | | |
|---|---|---|---|---|
| 4,400,042 | A * | 8/1983 | Fritz | 384/615 |
| 4,523,793 | A * | 6/1985 | Fritz | 384/604 |
| 4,606,657 | A * | 8/1986 | Tanaka | 384/492 |
| 4,778,287 | A * | 10/1988 | Jacob et al. | 384/613 |
| 5,501,530 | A * | 3/1996 | Nagai et al. | 384/516 |
| 6,206,665 | B1 * | 3/2001 | Iizuka | 418/55.3 |
| 6,244,408 | B1 * | 6/2001 | Tobayama et al. | 192/84.961 |
| 6,655,846 | B2 * | 12/2003 | Beckers et al. | 384/513 |
| 7,331,761 | B2 | 2/2008 | Hansen et al. | |
| 7,448,806 | B2 * | 11/2008 | Ishiguro et al. | 384/417 |
| 8,147,202 | B2 | 4/2012 | Bech | |
| 8,366,390 | B2 * | 2/2013 | Tiscareno et al. | 416/61 |
| 8,678,661 | B2 * | 3/2014 | Norimatsu | 384/516 |
| 2003/0048963 | A1 * | 3/2003 | Jacquemont et al. | 384/462 |
| 2005/0078899 | A1 * | 4/2005 | Chatry et al. | 384/513 |
| 2007/0104577 | A1 * | 5/2007 | Hansen et al. | 416/104 |
| 2009/0016665 | A1 * | 1/2009 | Yoshida et al. | 384/613 |
| 2010/0014791 | A1 * | 1/2010 | Versteegh et al. | 384/147 |
| 2010/0067838 | A1 * | 3/2010 | Frank | 384/477 |
| 2010/0092120 | A1 * | 4/2010 | Nies et al. | 384/513 |
| 2011/0235958 | A1 * | 9/2011 | Norimatsu | 384/544 |
| 2012/0141058 | A1 * | 6/2012 | Radinger et al. | 384/461 |
| 2013/0202234 | A1 * | 8/2013 | Noda et al. | 384/447 |
| 2014/0199171 | A1 * | 7/2014 | Jepsen | 416/174 |

FOREIGN PATENT DOCUMENTS

| | | | | |
|---|---|---|---|---|
| GB | | 2051971 A * | 1/1981 | F16N 7/20 |
| WO | WO 03/019004 | A1 | 3/2003 | |
| WO | WO 2008/074322 | A2 | 6/2008 | |
| WO | WO 2013/088201 | A1 | 6/2013 | |
| WO | WO 2013/117203 | A1 | 8/2013 | |

OTHER PUBLICATIONS

ThyssenKrupp, available at info@thyssenKrupp.com (Product Information Sheet).

Danish Patent and Trademark Office Search Report PA Application PA2014070512, dated Mar. 31, 2015.

* cited by examiner

WIND TURBINE BEARINGS

FIELD OF THE INVENTION

The present subject matter relates generally to wind turbines and, more particularly, to improved bearing configurations for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a pitch bearing disposed at the interface between the rotor blade and the wind turbine hub. Typically, conventional pitch bearings include two rows of balls concentrically disposed within separate raceways defined between inner and outer races, with each ball being configured to contact its corresponding raceway at four separate contact points. Under ideal loading conditions, the loads transmitted through the pitch bearing are distributed evenly over all of the balls. However, due to dynamic loading on the pitch bearing and the difference in stiffness between the hub and the rotor blade, only a small percentage of the balls actually end-up carrying the loads during operation of the wind turbine. As a result, the stresses within such load-carrying balls tend to exceed the design tolerances for the pitch bearing, leading to damage and potential failure of the pitch bearing. Moreover, under dynamic loads, the balls of conventional pitch bearings tend to run up and over the edges of the raceways, resulting in the balls having reduced contact areas with the raceways. This leads to an additional increase in the stresses within the balls, thereby further increasing the potential for damage to the pitch bearing components. Similar issues are also present in conventional yaw bearings for wind turbines.

Accordingly, an improved bearing configuration that addresses one or more of issues described above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a pitch bearing for coupling a rotor blade to a hub of a wind turbine. The pitch bearing may generally include an outer race configured to be coupled to the hub. The outer race may define a first outer raceway wall. The first outer raceway wall may define a curved profile having a center of curvature. The pitch bearing may also include an inner race rotatable relative to the outer race and configured to be coupled to the rotor blade. The inner race may define a first inner raceway wall. The first inner raceway wall may define a curved profile having a center of curvature. In addition, the pitch bearing may include a plurality of roller elements disposed between the first inner and outer raceway walls. Each of the roller elements may define a geometric center. The center of curvature for each of the first inner raceway wall and the first outer raceway wall may be offset from the geometric center of each of the first plurality of roller elements.

In another aspect, the present subject matter is directed to a pitch bearing for coupling a rotor blade to a hub of a wind turbine. The pitch bearing may include an outer race configured to be coupled to the hub. The outer race may define a first outer raceway wall and a second outer raceway wall. The pitch bearing may also include an inner race rotatable relative to the outer race and configured to be coupled to the rotor blade. The inner race may define a first inner raceway wall and a second inner raceway wall. The inner race may be at least partially spaced apart from the outer race such that a first gap is defined between the inner and outer races along an upper portion of the pitch bearing and a second gap is defined between the inner and outer races along a lower portion of the pitch bearing. The pitch bearing further includes a first plurality of roller elements disposed between the first inner and outer raceway walls and a second plurality of roller elements disposed between the second inner and outer raceway walls. Additionally, the pitch bearing includes a first seal disposed within the first gap directly between the inner and outer races and a second seal disposed within the second gap directly between the inner and outer races. The pitch bearing also includes a lubrication port defined through the outer race. The lubrication port may be configured to supply a lubricant from a location outside the pitch bearing to a location between the first and second plurality of roller elements.

In a further aspect, the present subject matter is directed to a slewring bearing for a wind turbine. The slewring bearing may include an outer race and an inner race rotatably coupled to the outer race. The inner race may be positioned relative to the outer race such that a raceway is defined between the inner and outer races. In addition, the slewring bearing may include a plurality of roller elements extending circumferentially around the raceway such that a single contact point is defined directly between each pair of adjacent roller elements.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to bearing configurations for a wind turbine. In several embodiments, a pitch bearing of the wind turbine may include a first raceway and a second raceway defined between inner and outer races of the bearing. The raceways may be configured such that the roller elements of the bearing contact the raceways at two opposed contact points oriented at a contact angle relative to the radial and axial directions. As will be described below, the disclosed bearing configuration(s) may allow for lower resultant loads to be applied through the roller elements, thereby reducing localized stress and decreasing the likelihood of component damage/failure. In addition, the pitch bearing may also include a raceway rib at least partially separating the first and second raceways. In several embodiments, the raceway rib may be configured to extend beyond a 90 degree location of each roller element. As a result, the roller elements may be prevented from running up and over the edge(s) of the raceways during dynamic loading conditions.

It should be appreciated that the disclosed pitch bearings have been uniquely configured to handle the dynamic loading of a wind turbine. Specifically, due to erratic moment loading and the fact that each pitch bearing is mounted directly to a relatively flexible rotor blade, pitch bearings must be equipped to handle axial and radial loads that can vary significantly with time. As will be described below, the disclosed bearings provide for higher contact angles and a wider support base (i.e., wider load span), thereby reducing the resultant loads applied through each roller element. Accordingly, each roller element may deflect less and, thus, may retain more of an overall share of the entire load, thereby decreasing the stress on the bearing.

It should also be appreciated that, although the present subject matter will be generally described herein with reference to pitch bearings, the disclosed bearing configurations may be utilized within any suitable wind turbine bearing. For instance, yaw bearings are often subject to dynamic loading during operation of a wind turbine. Thus, the disclosed bearing configurations may also be implemented within the yaw bearing of a wind turbine to reduce stresses within the bearing.

Figure 1:
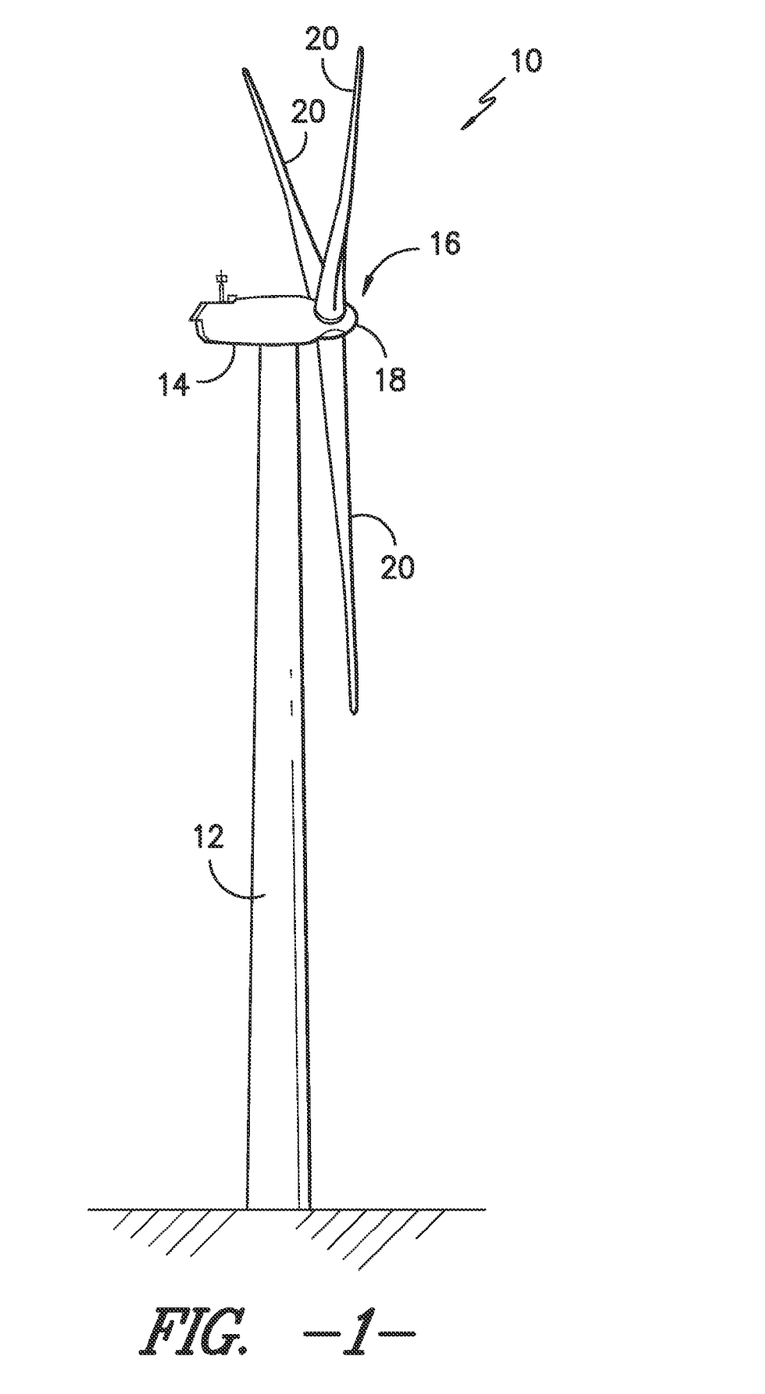
FIG. 1 illustrates a perspective view of one embodiment of a wind turbine.

Referring now to the drawings, FIG. 1 illustrates a side view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 224 (FIG. 2) positioned within the nacelle 14 to permit electrical energy to be produced.

Figure 2:
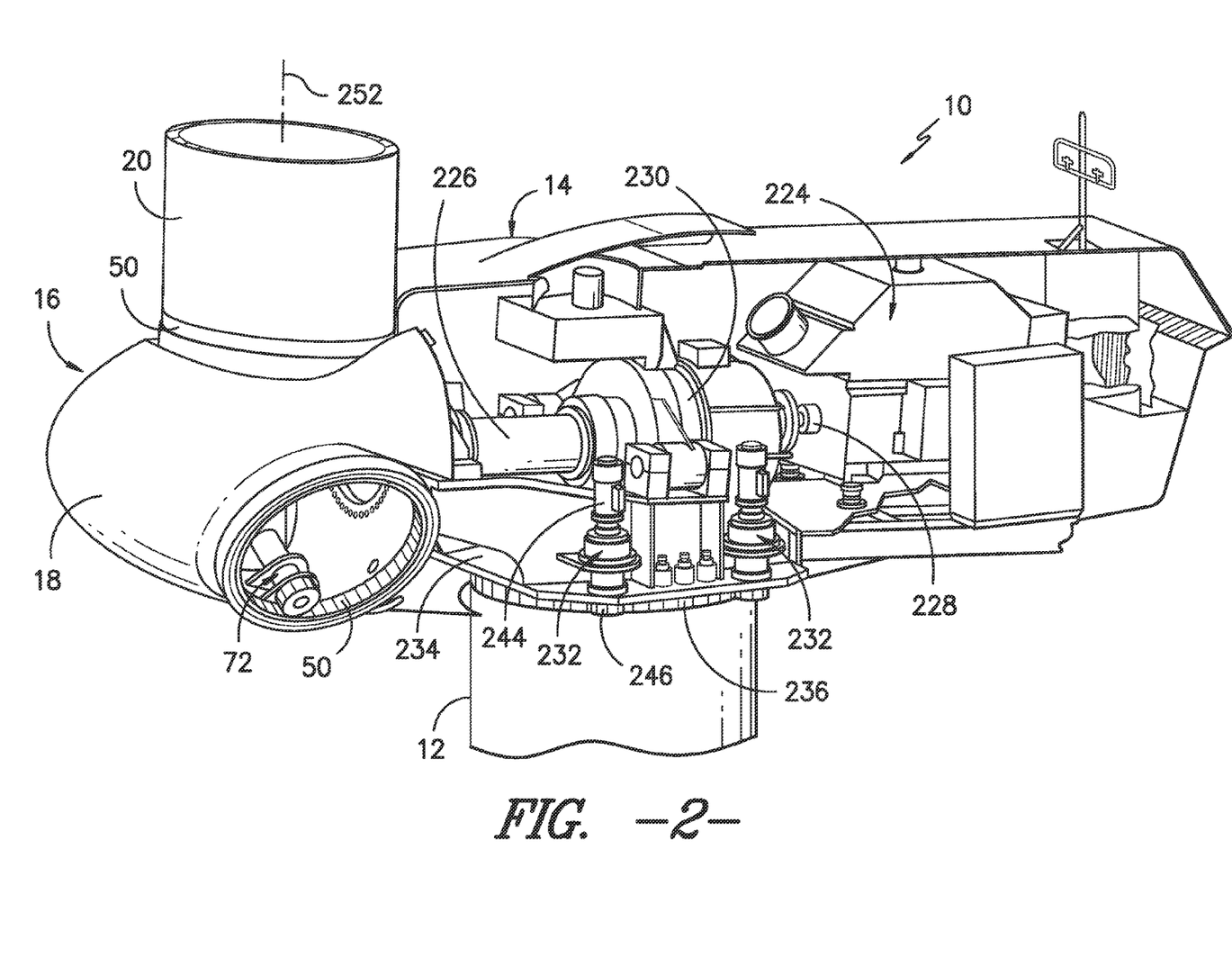
FIG. 2 illustrates a perspective, internal view of the nacelle of the wind turbine shown in FIG. 1

Referring now to FIG. 2, a simplified, internal view of one embodiment of the nacelle 14 of the wind turbine 10 shown in FIG. 1 is illustrated. As shown, a generator 224 may be disposed within the nacelle 16. In general, the generator 224 may be coupled to the rotor 16 of the wind turbine 10 for generating electrical power from the rotational energy generated by the rotor 16. For example, the rotor 16 may include a rotor shaft 226 coupled to the hub 18 for rotation therewith. The generator 224 may then be coupled to the rotor shaft 226 such that rotation of the rotor shaft 226 drives the generator 224. For instance, in the illustrated embodiment, the generator 224 includes a generator shaft 228 rotatably coupled to the rotor shaft 226 through a gearbox 230. However, in other embodiments, it should be appreciated that the generator shaft 228 may be rotatably coupled directly to the rotor shaft 226. Alternatively, the generator 224 may be directly rotatably coupled to the rotor shaft 226 (often referred to as a "direct-drive wind turbine").

Additionally, the wind turbine 10 may include one or more yaw drive mechanisms 232 mounted to and/or through a bedplate 234 positioned atop the wind turbine tower 12. Specifically, each yaw drive mechanism 232 may be mounted to and/or through the bedplate 234 so as to engage a yaw bearing 236 coupled between the bedplate 234 and the tower 12 of the wind turbine 10. The yaw bearing 236 may be mounted to the bed plate 234 such that, as the yaw bearing 236 rotates about a yaw axis (not shown) of the wind turbine 10, the bedplate 234 and, thus, the nacelle 14 are similarly rotated about the yaw axis.

In general, it should be appreciated that the yaw drive mechanisms 232 may have any suitable configuration and may include any suitable components known in the art that allow such mechanisms 232 to function as described herein. For example, as shown in FIG. 2, each yaw drive mechanism 232 may include a yaw motor 244 mounted to the bedplate 234. The yaw motor 244 may be coupled to a yaw gear 246 (e.g., a pinion gear) configured to engage the yaw bearing 236. For instance, the yaw motor 244 may be coupled to the yaw gear 246 directly (e.g., by an output shaft (not shown) extending through the bedplate 234) or indirectly through a suitable gear assembly coupled between the yaw motor 244 and the yaw gear 246. As such, the torque generated by the yaw motor 244 may be transmitted through the yaw gear 246 and applied to the yaw bearing 236 to permit the nacelle 14 to be rotated about the yaw axis of the wind turbine 10. It should be appreciated that, although the illustrated wind turbine 10 is shown as including two yaw drive mechanisms 232, the wind turbine 10 may generally include any suitable number of yaw drive mechanisms 232.

Similarly, it should be appreciated that the yaw bearing 236 may generally have any suitable configuration, including one or more of the bearing configurations described below. For instance, in several embodiments, the yaw bearing 236 may include an inner race and an outer race rotatable relative to the inner race, with one or more rows of roller elements being disposed between the inner and outer races. In such embodiments, the yaw gear 246 may be configured to engage the outer race of the yaw bearing 236 such that the outer race is rotated relative to the inner race to adjust the orientation of the nacelle 14 relative to the direction of the wind.

Referring still to FIG. 2, the wind turbine 10 may also include a plurality of pitch bearings 50, with each pitch bearing 50 being coupled between the hub 18 and one of the rotor blades 20. As will be described below, the pitch bearings 50 may be configured to allow each rotor blade 20 to be rotated about its pitch axis 252 (e.g., via a pitch adjustment mechanism 72), thereby allowing the orientation of each blade 20 to be adjusted relative to the direction of the wind.

It should be appreciated that, as used herein, the term "slewring bearing" may be used to refer to the yaw bearing 236 of the wind turbine 10 and/or one of the pitch bearings 50 of the wind turbine 10.

Figure 3:
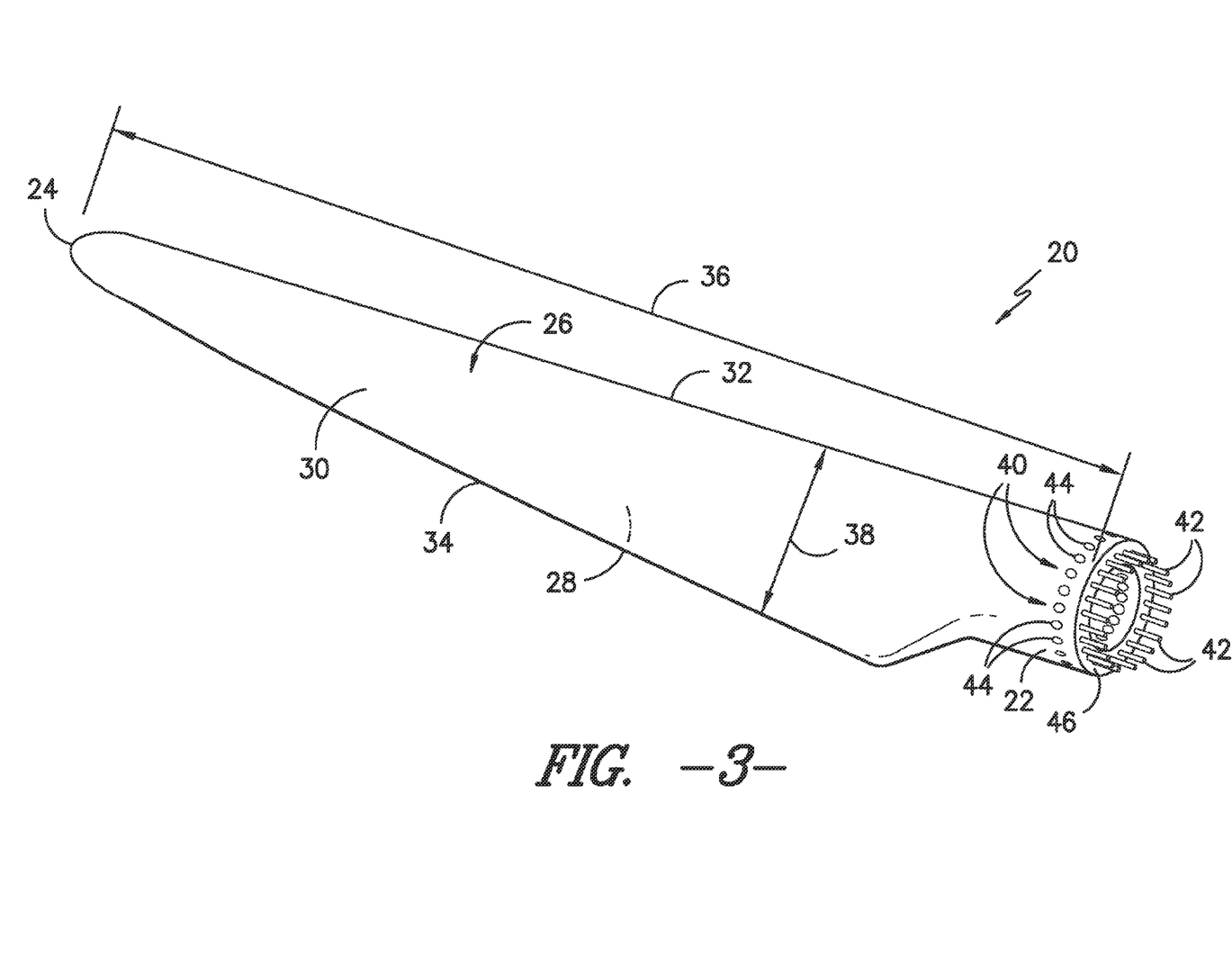
FIG. 3 illustrates a perspective view of one of the rotor blades of the wind turbine shown in FIG. 1.

Referring now to FIG. 3, a perspective view of one of the rotor blades 20 shown in FIGS. 1 and 2 is illustrated in accordance with aspects of the present subject matter. As shown, the rotor blade 20 includes a blade root 22 configured for mounting the rotor blade 20 to the hub 18 of a wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via one of the pitch bearings 50), as will be described in greater detail below.

Figure 4:
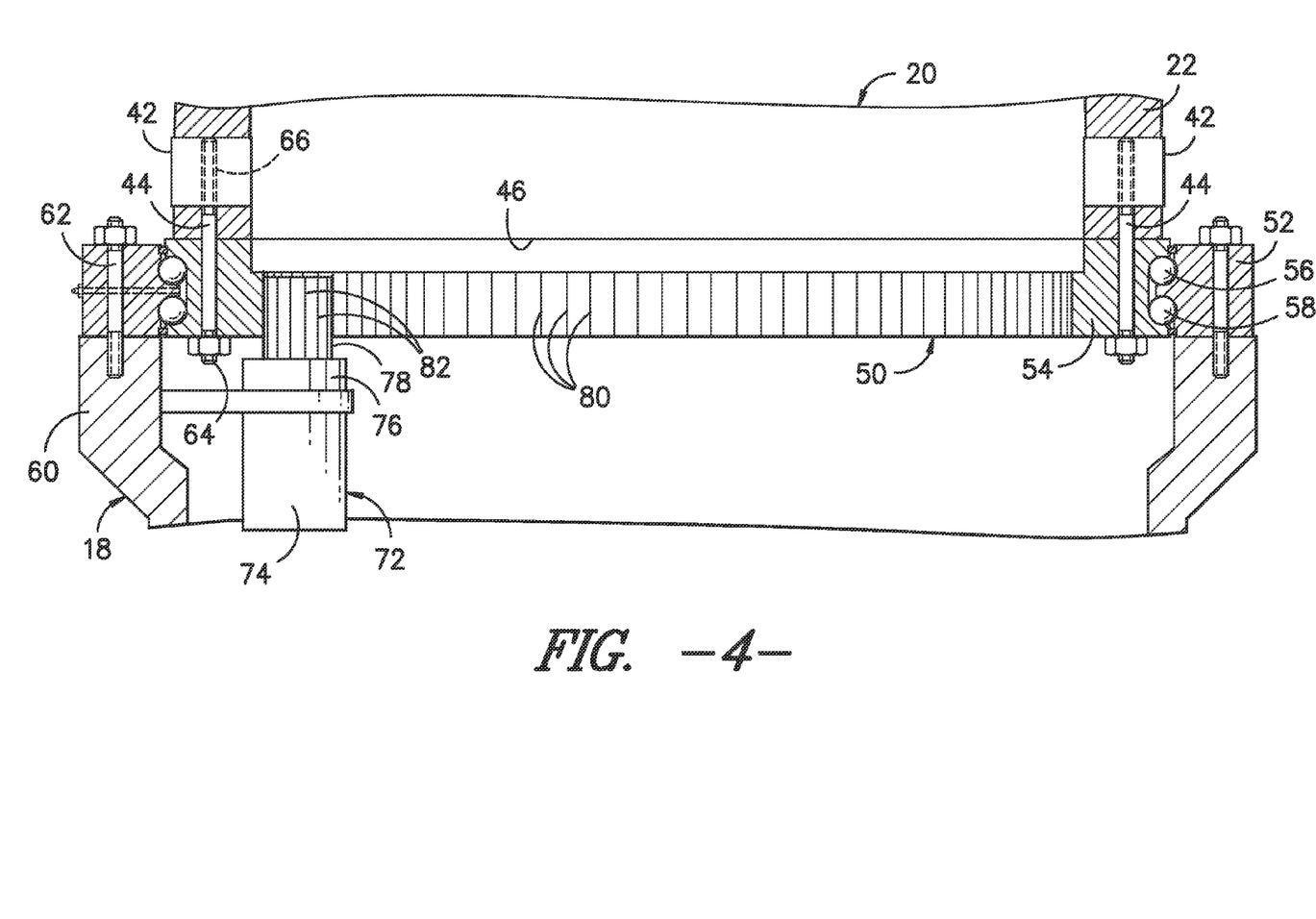
FIG. 4 illustrates a cross-sectional view of one embodiment of a rotor blade coupled to a wind turbine hub via a pitch bearing configured in accordance with aspects of the present subject matter.

Referring now to FIG. 4, a partial, cross-sectional view of the rotor blade 20 shown in FIG. 3 is illustrated, particularly illustrating the rotor blade 20 mounted onto the hub 18 via a pitch bearing 50 configured in accordance with aspects of the present subject matter. As shown, the pitch bearing 50 includes an outer bearing race 52, an inner bearing race 54, and a plurality of roller elements 56, 58 (e.g., a first row of balls 56 and a second row of balls 58) disposed between the outer and inner races 52, 54. The outer race 52 may generally be configured to be mounted to a hub flange 60 of the hub 18 using a plurality of hub bolts 62 and/or other suitable fastening mechanisms. Similarly, the inner race 54 may be configured to be mounted to the blade root 22 using the root bolts 44 of the root attachment assemblies 40. For example, as shown in FIG. 4, each root bolt 44 may extend between a first end 64 and a second end 66. The first end 64 may be configured to be coupled to a portion of the inner race 54, such as by coupling the first end 64 to the inner race 54 using an attachment nut and/or other suitable fastening mechanism. The second end 66 of each root bolt 44 may be configured to be coupled to the blade root 22 via the barrel nut 42 of each root attachment assembly 40.

As is generally understood, the inner race 54 may be configured to be rotated relative to the outer race 52 (via the roller elements 56, 58) to allow the pitch angle of each rotor blade 20 to be adjusted. As shown in FIG. 4, such relative rotation of the outer and inner races 52, 54 may be achieved using a pitch adjustment mechanism 72 mounted within a portion of the hub 18. In general, the pitch adjustment mechanism 72 may include any suitable components and may have any suitable configuration that allows the mechanism 72 to function as described herein. For example, as shown in the illustrated embodiment, the pitch adjustment mechanism 72 may include a pitch drive motor 74 (e.g., an electric motor), a pitch drive gearbox 76, and a pitch drive pinion 78. In such an embodiment, the pitch drive motor 74 may be coupled to the pitch drive gearbox 76 so that the motor 74 imparts mechanical force to the gearbox 76. Similarly, the gearbox 76 may be coupled to the pitch drive pinion 78 for rotation therewith. The pinion 78 may, in turn, be in rotational engagement with the inner race 54. For example, as shown in FIG. 4, a plurality of gear teeth 80 may be formed along the inner circumference of the inner race 54, with the gear teeth 80 being configured to mesh with corresponding gear teeth 82 formed on the pinion 78. Thus, due to meshing of the gear teeth 80, 82, rotation of the pitch drive pinion 78 results in rotation of the inner race 54 relative to the outer race 52 and, thus, rotation of the rotor blade 20 relative to the hub 18.

Figure 5:
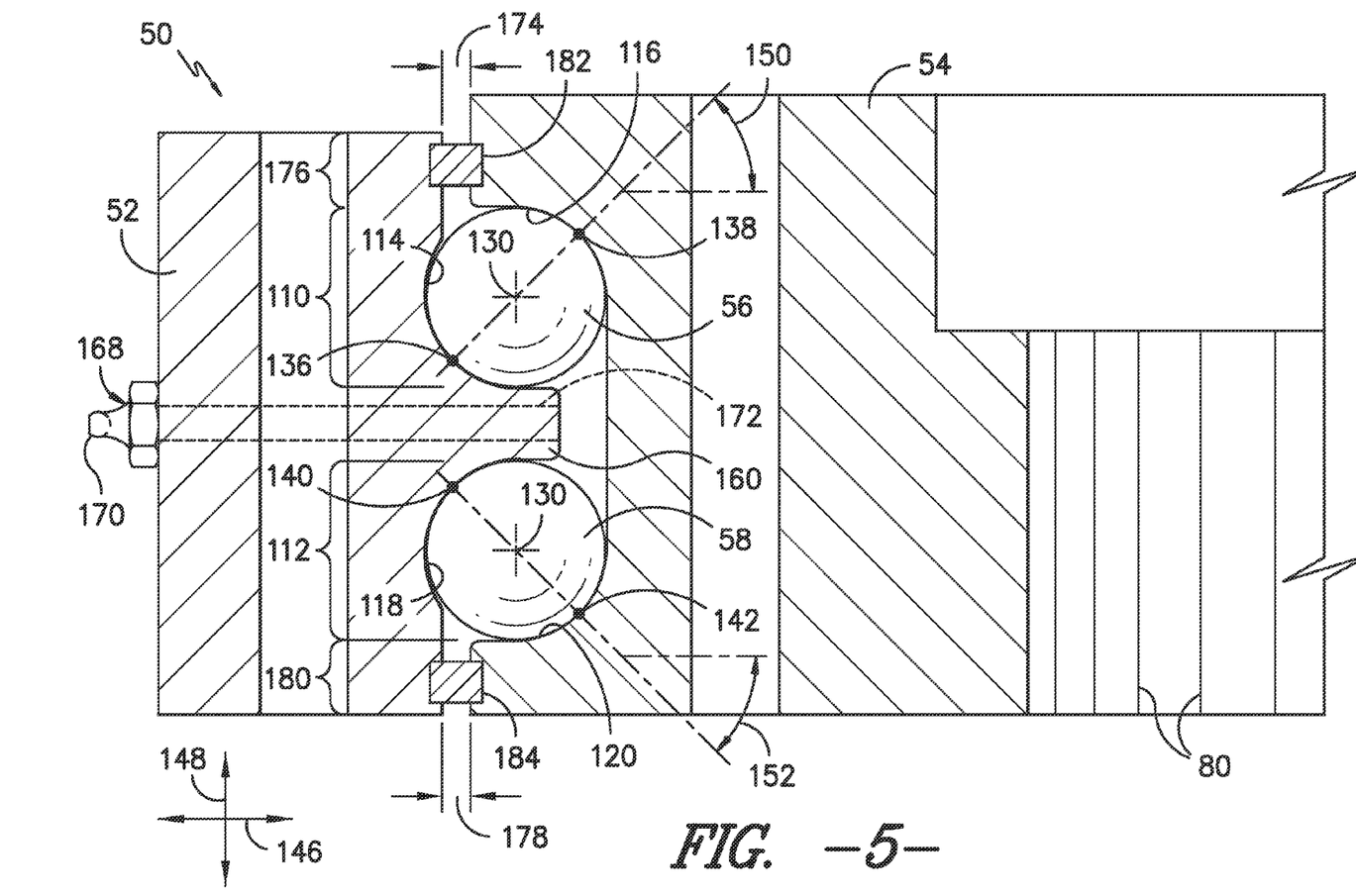
FIG. 5 illustrates a cross-sectional view of a portion of the pitch bearing shown in FIG. 4.
Figure 6:
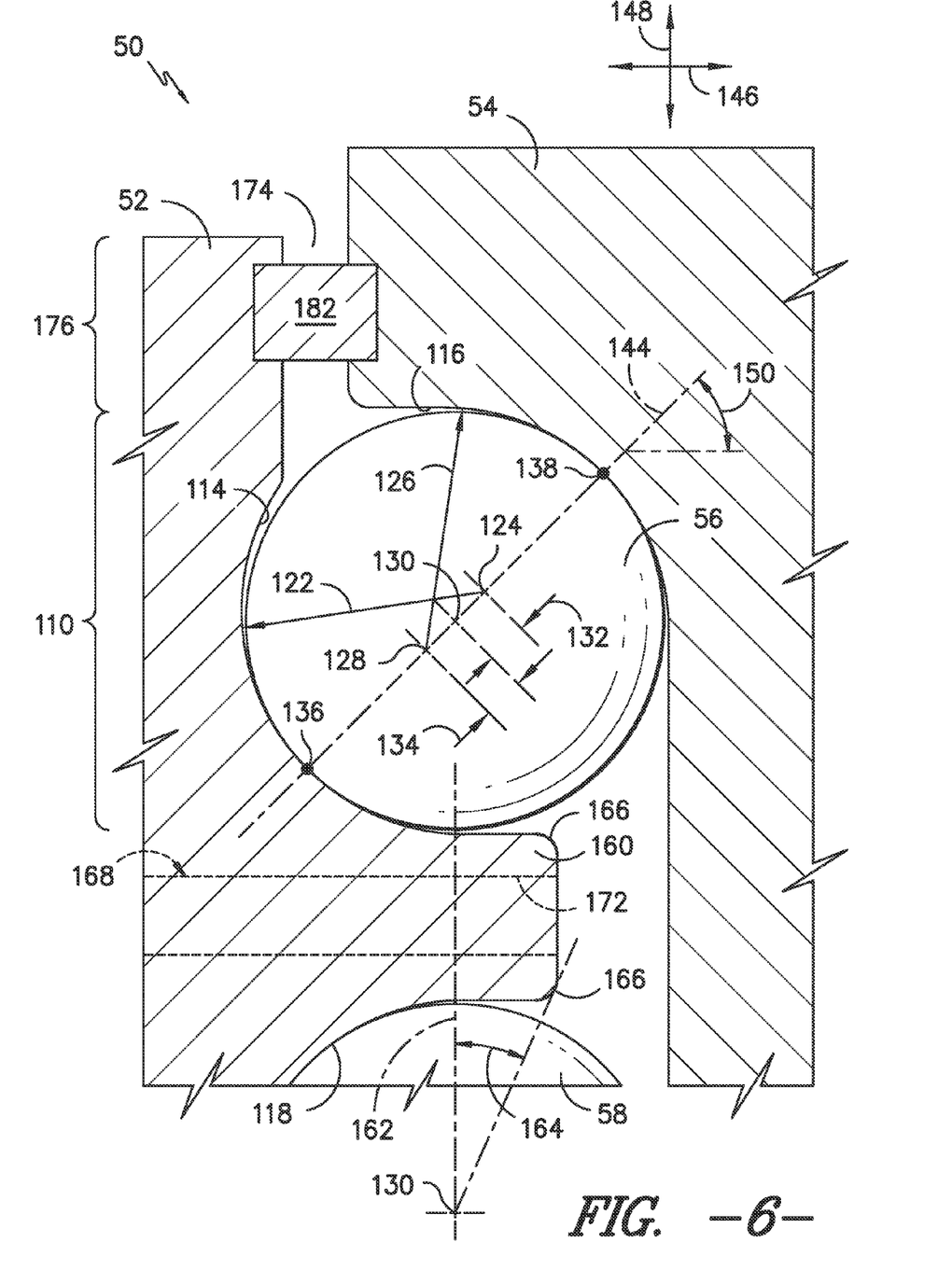
FIG. 6 illustrates a close-up, cross-sectional view of a portion of the pitch bearing shown in FIG. 5.

Referring now to FIGS. 5 and 6, close-up, cross-sectional views of portions of the pitch bearing 50 shown in FIG. 4 are illustrated in accordance with aspects of the present subject matter. As shown, the roller elements 56, 58 are configured to be received within separate raceways defined between the inner and outer races 52, 54. Specifically, a first raceway 110 is defined between the inner and outer races 52, 54 for receiving the first row of roller elements 56 and a second raceway 112 is defined between the inner and outer races 52, 54 for receiving the second row of roller elements 58. In such an embodiment, each raceway 110, 112 may be defined by separate walls of the outer and inner races 52, 54. For instance, as shown in FIGS. 5 and 6, the first raceway 110 is defined by a first outer raceway wall 114 of the outer race 52 and a first inner raceway wall 116 of the inner race 54. Similarly, the second raceway 112 is defined by a second outer raceway wall 118 of the outer race 54 and a second inner raceway wall 120 of the inner race 120.

In general, each raceway wall 114, 116, 118, 120 may be configured to define a curved profile. For example, as particularly shown in FIG. 6, the first outer raceway wall 114 generally corresponds to a curved wall extending around the inner circumference of the outer race 52 that defines a radius 122 extending from a center of curvature 124 of such wall. Similarly, the first inner raceway wall 114 generally corresponds to a curved wall extending around the outer circumference of the inner race 54 that defines a radius 126 extending from a center of curvature 128 of such wall. Although not shown, the second outer raceway wall 118 may also define a radius having a center of curvature and the second inner raceway wall 120 may similarly define a radius having a center of curvature.

In several embodiments, the center of curvature 124, 128 for each raceway wall 114, 116, 118, 120 may be offset from a geometric center 130 of each roller element 56, 58. For instance, as shown in FIG. 6, the center of curvature 124 of the first outer raceway wall 114 is offset from the geometric center 130 of the roller element 56 by a first distance 132 while the center of curvature 128 of the first inner raceway wall 116 is offset from the geometric center 130 by a second distance 134. Although not shown in FIG. 6, it should be appreciated that the second outer and inner raceway walls 118, 120 may be configured similar to the first outer and inner raceway walls 114, 116. For instance, the centers of curvature for the second outer and inner raceway walls 118, 120 may be offset from the geometric center 130 of each roller element 58 by respective distances (e.g., the first and second distances 132, 134).

It should also be appreciated that, in one embodiment, the first distance 132 may be the same as the second distance 134. Alternatively, the first distance 132 may differ from the second distance 134. Additionally, it should be appreciated that the distances 132, 134 may generally correspond to any suitable length. For instance, in a particular embodiment, the first and second distances 132, 134 may each correspond to a length ranging from about 0.1 millimeters (mm) to about 5 mm, such as from about 0.4 mm to about 1 mm or from about 1.3 mm to about 2.5 mm and any other subranges therebetween.

By configuring the raceway walls 114, 116, 118, 120 so that each center of curvature 124, 128 is offset from the geometric center 130 of the roller elements 56, 58, each roller element 56, 58 may include two contact points 136, 138, 140, 142 defined along reference lines 144 that are angled relative to the radial direction (indicated by arrow 146) and the axial direction (indicated by arrow 148) of the pitch bearing 50. Specifically, as shown in FIGS. 5 and 6, each roller element 56 is configured to contact the first outer raceway wall 114 at a first outer contact point 136 and the first inner raceway wall 116 at a first inner contact point 138, with the first outer and inner contact points 136, 138 being defined along a reference line 144 oriented at a first contact angle 150. Similarly, each roller element 58 may be configured to contact the second outer raceway wall 118 at a second outer contact point 140 and the second inner raceway wall 120 at a second inner contact point 142, with the second outer and inner contact points 140, 142 being defined along a reference line 144 oriented at a second contact angle 152.

It should be appreciated that the contact angles 150, 152 defined by the reference lines 144 may generally correspond to any suitable angle(s). However, in several embodiments, each reference line 144 may be configured to extend at a contact angle 150, 152 relative to the radial direction 146 ranging from about 15 degrees to about 85 degrees, such as from about 40 degrees to about 48 degrees or from about 49 degrees to about 70 degrees and any other subranges therebetween.

It should also be appreciated that first and second contact angles 150, 152 may be the same angle or different angles. Specifically, as the contact angle approaches zero degrees, the corresponding roller elements may be better equipped to handle radial loads whereas, as the contact angle approaches ninety degrees, the corresponding roller elements may be better equipped to handle axial loads. Thus, by differing the contact angles 150, 152, each row of roller elements 56, 58 may be stiffer in a given direction, such as by configuring the first row of roller elements 56 to be axially stiffer (e.g., by selecting the first contact angle 150 to be closer to 90 degrees) and the second row of roller elements 58 to be radially stiffer (e.g., by selecting the second contact angle 152 to be closer to 0 degrees).

Figure 7:
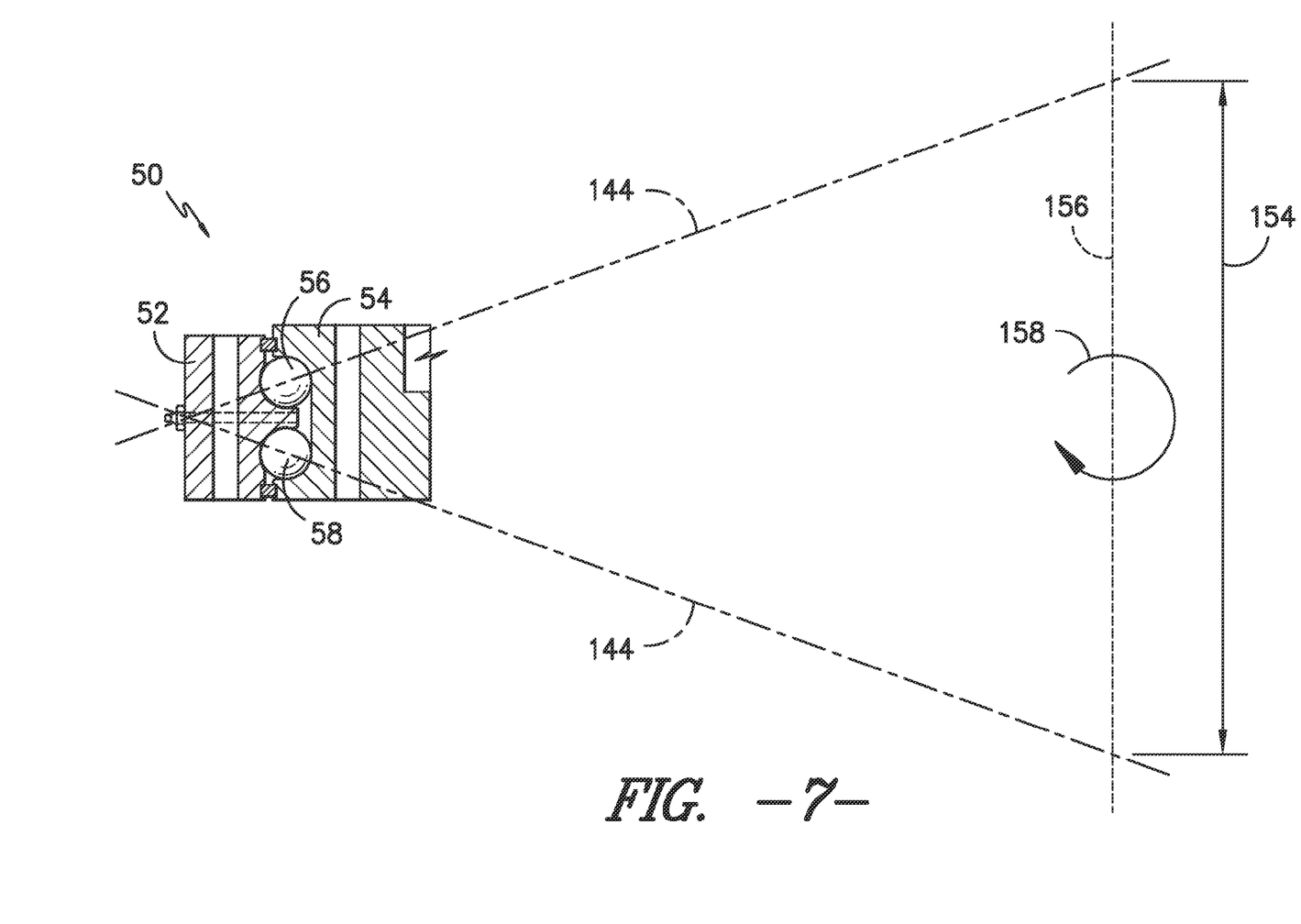
FIG. 7 illustrates another cross-sectional view of the pitch bearing shown in FIG. 5, particularly illustrating the force span resulting from the disclosed bearing configuration.

By orienting the contact points 136, 138, 140, 142 along reference lines 155 extending at an angle relative to both the radial and axial directions 146, 148, the roller elements 56, 58 may be capable of carrying both radial and axial loads. In addition, by orienting the contact points 136, 138, 140, 142 so that the reference lines 144 intersect one another (as opposed to being parallel), an increased force span may be defined at the center of the pitch bearing 50, thereby resulting in lower resultant forces being applied through the roller elements 56, 58. For example, as shown in FIG. 7, the reference lines 144 are angled away from each other so that a large force span 154 is defined along a center line 156 extending through the center of the pitch bearing 50. As is generally understood, the force on the roller elements 56, 58 resulting from moment loading 158 on the pitch bearing 50 is generally equal to the moment divided by the force span 154. Thus, by increasing the force span 150, the resultant forces transmitted through the roller elements 56, 58 may be reduced, thereby decreasing the risk of damage to and/or failure of the pitch bearing components.

Figure 8:
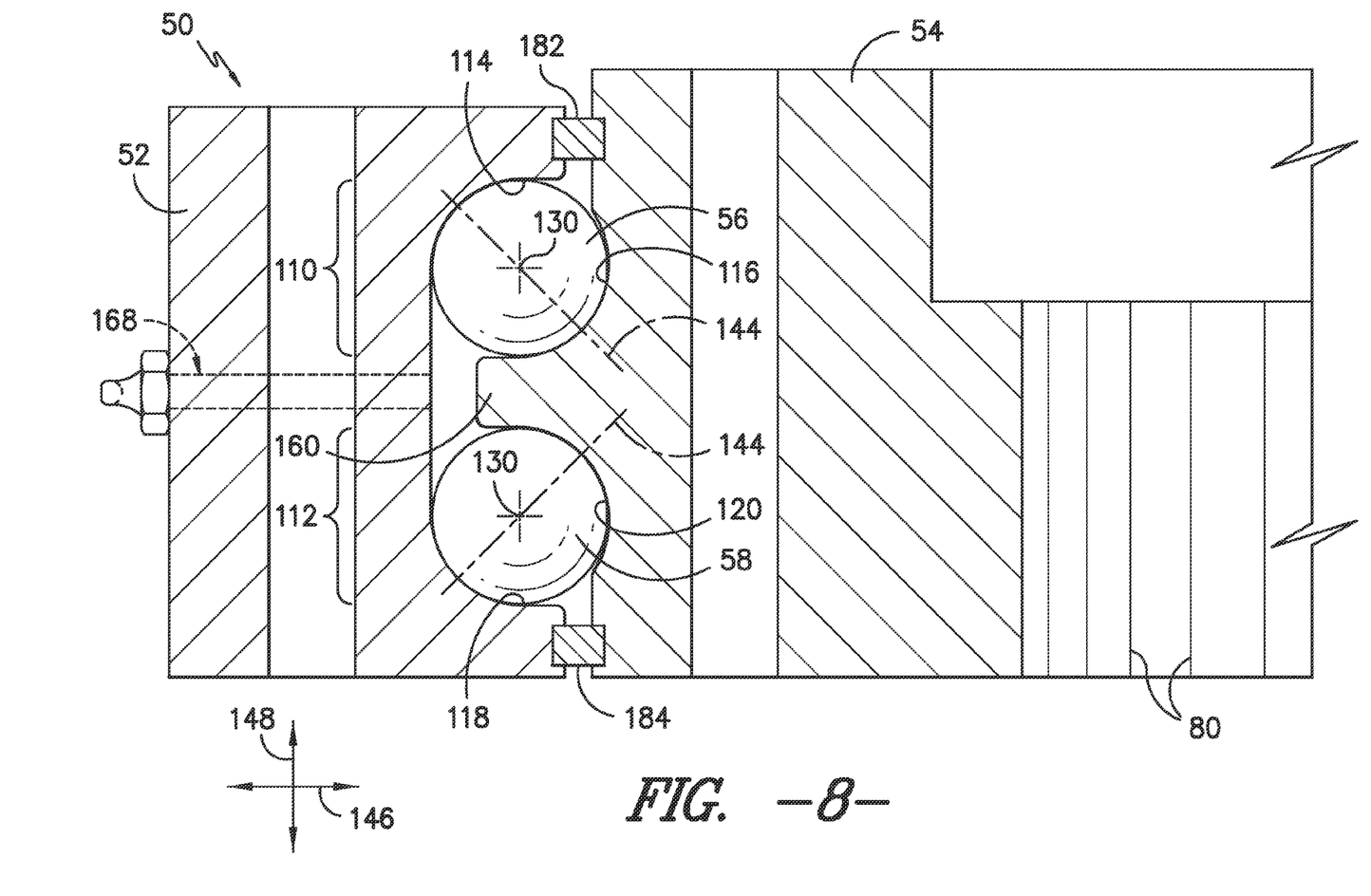
FIG. 8 illustrates a cross-sectional view of another embodiment of a pitch bearing configured in accordance with aspects of the present subject matter.

Referring back to FIGS. 5 and 6, the pitch bearing may also include a raceway rib 160 at least partially dividing the first raceway 110 from the second raceway 112. In several embodiments, the raceway rib 160 may form an extension of the outer race 52. For instance, as shown in FIGS. 5 and 6, the raceway rib 160 may correspond to a radial projection of the outer race 52 that extends between the roller elements 56, 58 and separates the first outer raceway wall 114 from the second outer raceway wall 118. Alternatively, the raceway rib 160 may be configured to form an extension of the inner race 54. For instance, as shown in the cross-sectional view of FIG. 8, the raceway rib 160 may correspond to a radial projection of the inner race 54 configured to extend between the roller elements 56, 58 and separate the first inner raceway wall 116 from the second inner raceway wall 118.

As particularly shown in FIG. 6, in several embodiments, the raceway rib 160 may be configured such that the raceway walls defining the outer surfaces of the rib 160 extend beyond a 90 degree location of the roller elements 56, 58, which is indicated by a reference line 162 passing through the geometric center 130 of the roller elements 56, 58 and extending along the axial direction 148 (i.e., perpendicular to the radial direction 146). For instance, in the illustrated embodiment, the raceway rib 160 extends between the roller elements 56, 58 such that the arc length of the portion of the outer raceway walls 114, 118 extending beyond the 90 degree location 162 defines an angle 164 ranging from about 0 degrees to about 60 degrees, such as from about 15 degrees to about 45 degrees or from about 25 degrees to about 50 degrees and any other subranges therebetween. Similarly, when the raceway rib 160 is configured as an extension of the inner race 150, the inner raceway walls 116, 120 may also be configured to extend beyond the 90 degree location 162 at such an angle 164.

By configuring the raceway rib 160 to extend beyond the 90 degree location 162, the roller elements 56, 58 may be fully supported within the pitch bearing 50 during dynamic loading events. For instance, if the roller elements 56, 58 run up/down the raceway walls 114, 116, 118, 120 towards the 90 degree location 162 during high loading events, the roller elements 56, 58 may be supported between the inner and outer races 52, 54 without contacting the edges of the raceways 110, 112 (e.g., edges 166 (FIG. 6) defined by the outer raceway walls 114, 118).

Figure 9:
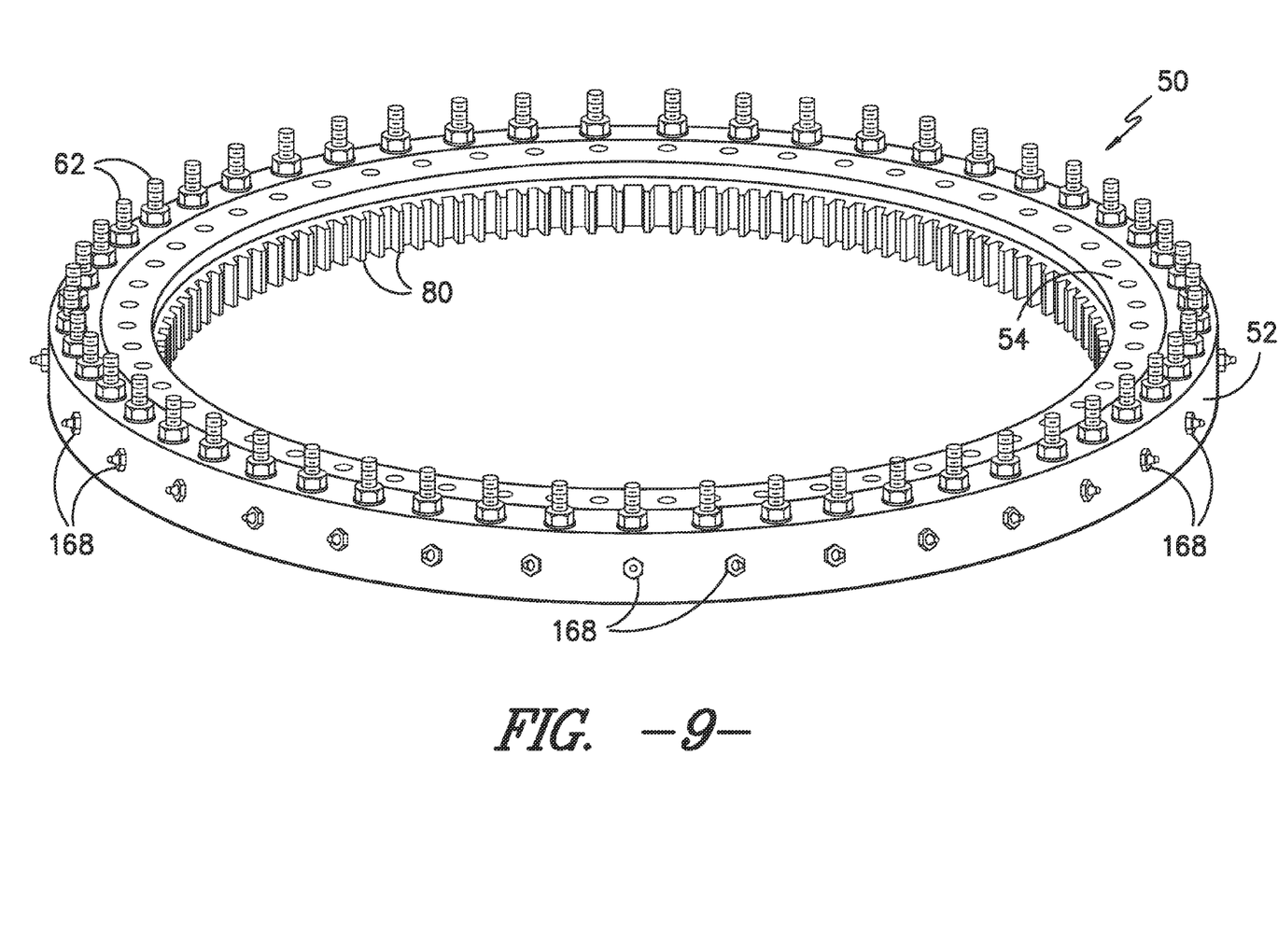
FIG. 9 illustrates a perspective view of the pitch bearing shown in FIG. 4.

Additionally, in several embodiments, a plurality of lubrication ports 168 may be defined through the outer race 52. For instance, as shown in the perspective view of FIG. 9, the lubrication ports 168 may be spaced apart circumferentially around the outer circumference of the outer race 52. In general, each lubrication port 168 may be configured to supply a suitable lubricant (e.g., grease, etc.) from a location outside the pitch bearing 50 to a location between the first and second raceways 110, 112. Thus, as shown in FIG. 6, each lubrication port 168 may generally extend between a first end 170 disposed along the outer circumference of the outer race 52 and a second end 172 disposed along the inner circumference of the outer race 52. For instance, in the illustrated embodiment, the second end 172 is defined through the raceway rib 160 so that lubricant may be delivered into the gap defined between the rib 160 and the outer circumference of the inner race 54. The lubricant may then be directed up and down between the outer and inner races 52, 54 to lubricate the first and second raceways 110, 112.

Additionally, to maintain the lubricant within the pitch bearing 50, any gaps defined between the outer and inner races 52, 54 may be sealed using suitable sealing mechanisms. For instance, as shown in FIG. 6, the pitch bearing includes a first gap 174 defined between the outer and inner races 52, 54 along an upper portion 176 of the bearing 50 and a second gap 178 defined between the outer and inner races 52, 54 along a lower portion 180 of the bearing 50. In such an embodiment, a first sealing mechanism 182 may be disposed directly between the outer and inner races 52, 54 to seal the first gap 174 and a second sealing mechanism 184 may be disposed directly between the outer and inner races 52, 54 to seal the second gap 178.

It should be appreciated that, although not shown, the roller elements 56, 58 contained within each row may be spaced apart circumferentially from one another using conventional cages and/or spacers. Alternatively, as will be described below, the pitch bearing 50 may include a full complement of roller elements 56, 58 extending circumferentially around each raceway 110, 112.

It should also be appreciated that the bearing configuration(s) shown in FIGS. 4-9 may be utilized with any other suitable wind turbine bearing(s). For instance, in several embodiments, the bearing configuration(s) may be utilized within the yaw bearing 236 of a wind turbine 10.

Figure 10:
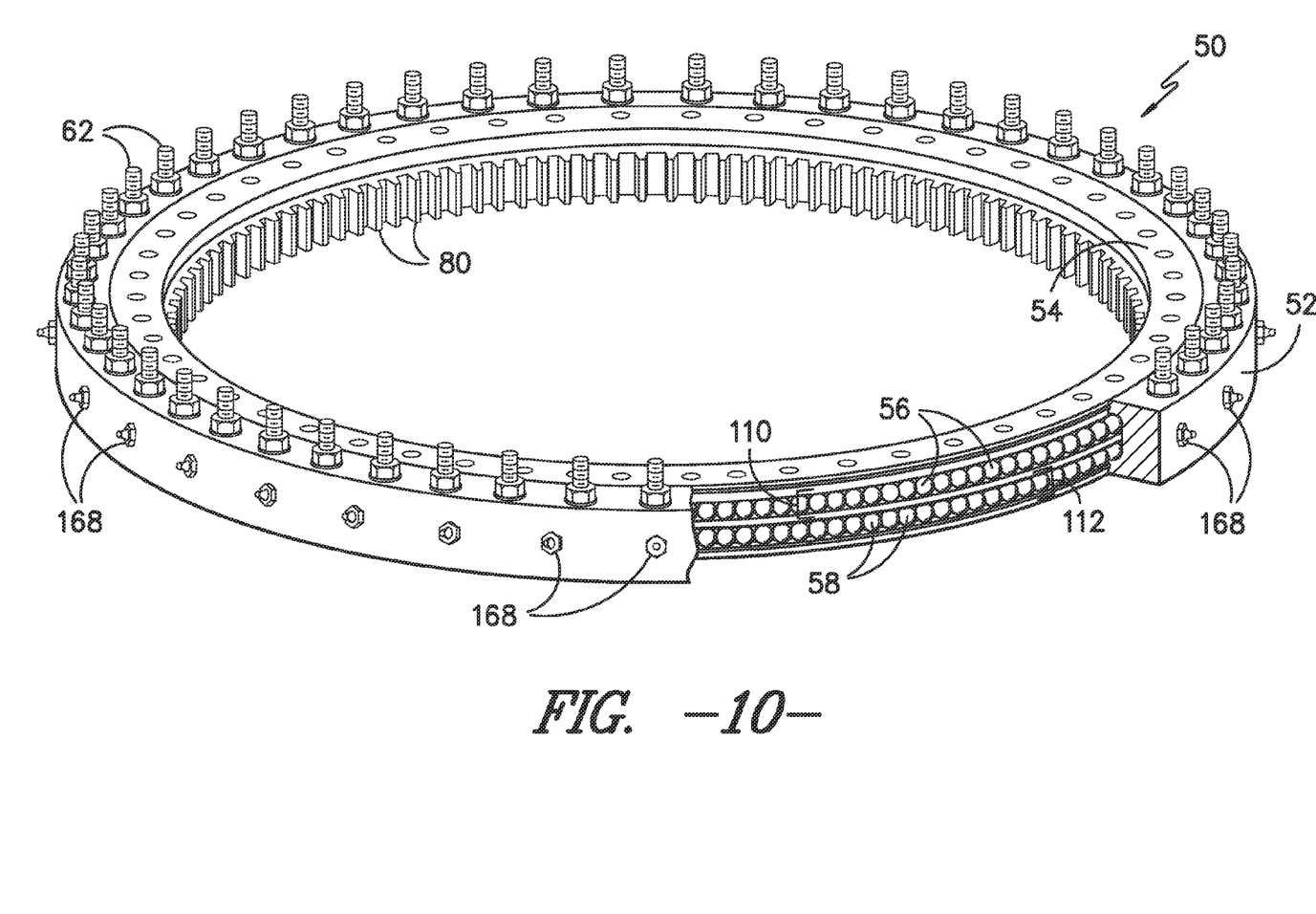
FIG. 10 illustrates a perspective, partially cut-away view of another embodiment of a pitch bearing, particularly illustrating the pitch bearing including a full complement of roller elements around each row of roller elements.
Figure 11:
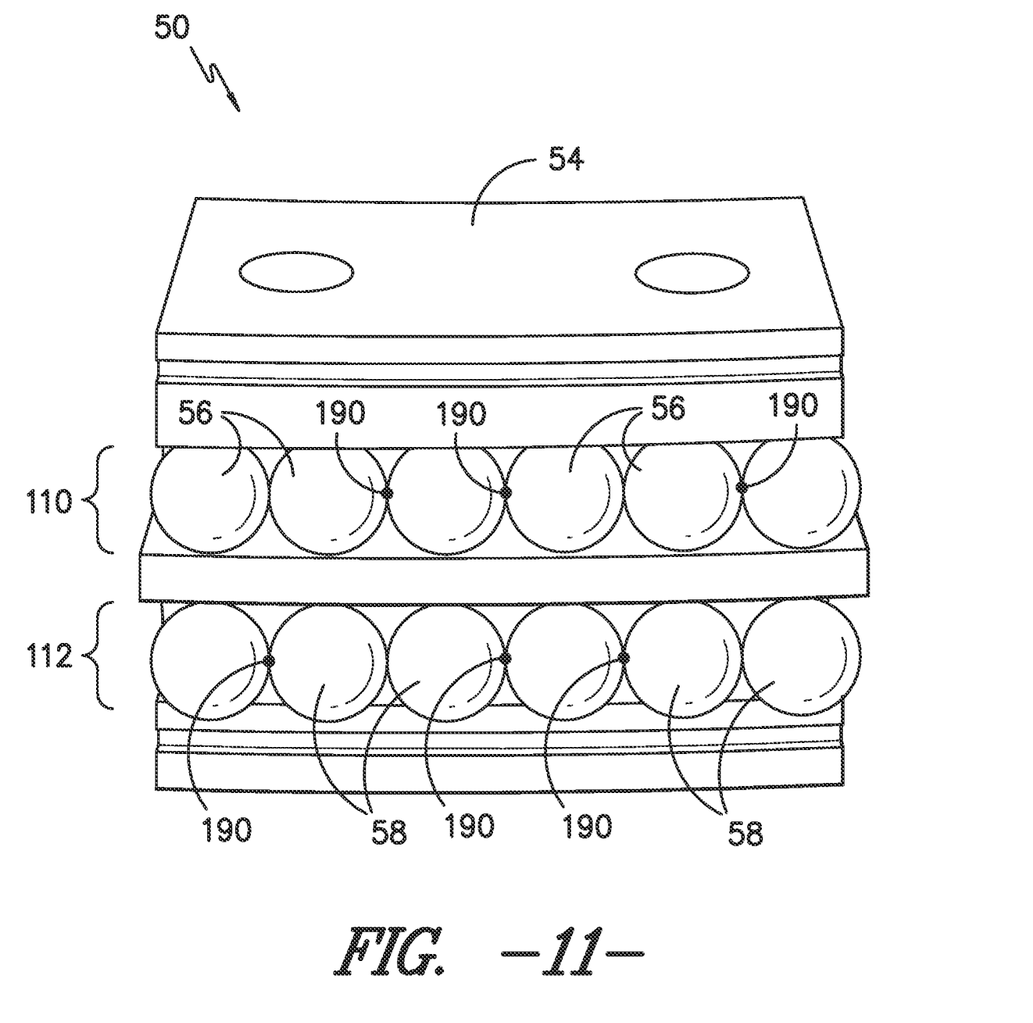
FIG. 11 illustrates a close-up view of a portion of the pitch bearing shown in FIG. 10.

Referring now to FIGS. 10 and 11, perspective views of another embodiment of a bearing configuration are illustrated in accordance with aspects of the present subject matter. Specifically, FIG. 10 illustrates a perspective, partially cut-away view of a pitch bearing 50 having a full complement of roller elements 56, 58. Additionally, FIG. 11 illustrates a close-up view of a portion of the pitch bearing 50 shown in FIG. 10.

As shown in the illustrated embodiment, the pitch bearing 50 may include a plurality of roller elements 56, 58 (i.e., balls) extending circumferentially around each raceway 110, 112, with each roller element 56, 58 directly contacting its adjacent roller elements 56, 58. Specifically, as shown in FIG. 11, the roller elements 56, 58 may be installed within each raceway 110, 112 such that a single contact point 190 is defined between each pair of adjacent roller elements 56, 58.

By configuring the bearing 50 to include a full complement of roller elements 56, 58, additional roller elements may be installed within the bearing 50. Specifically, conventional bearing configurations typically include separators, such as cages and/or spacers, that are designed to space the roller elements 56, 58 apart circumferentially around each raceway 110, 112. By removing the cages/spacers, the space typically inhabited by such separators may be replaced with additional roller elements 56, 58. As such, the load capacity of the bearing 50 may be increased while the stresses acting on the bearing 50 may be reduced.

It should be appreciated that, in several embodiments, the full complement of roller elements 56, 58 shown in FIGS. 10 and 11 may be utilized together with the bearing configuration described above with reference to FIGS. 4-9. Alternatively, the full complement of roller elements 56, 58 may be utilized together with any other suitable pitch bearing configuration, including conventional pitch bearing configurations. Additionally, it should be appreciated that the bearing configuration shown in FIGS. 10 and 11 may be utilized with any other suitable wind turbine bearing(s). For instance, in several embodiments, the full complement of roller elements 56, 58 may be utilized within the yaw bearing 236 of a wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pitch bearing for coupling a rotor blade to a hub of a wind turbine, the pitch bearing comprising:

an outer race configured to be coupled to the hub, the outer race defining a first outer raceway wall and a second outer raceway wall, the first outer raceway wall defining a curved profile having a center of curvature;

an inner race rotatable relative to the outer race and configured to be coupled to the rotor blade, the inner race defining a first inner raceway wall and a second inner raceway wall, the first inner raceway wall defining a curved profile having a center of curvature;

a first plurality of roller elements disposed between the first inner and outer raceway walls, each of the first plurality of roller elements defining a geometric center, a single contact point being defined directly between each adjacent pair of roller elements of the first plurality of roller elements;

a second plurality of rollers disposed between the second inner and outer raceway walls, each of the second plurality of roller elements defining a geometric center; and a raceway rib extending between the first and second plurality of roller elements, the raceway rib forming an extension of the outer race and separating the first outer raceway wall from the second outer raceway wall, the raceway rib extending radially inwardly from the outer race to a radial location located radially inwardly relative to a reference line extending directly between the geometric centers of each of the first and second plurality of roller elements, wherein the center of curvature for each of the first inner raceway wall and the first outer raceway wall is offset from the geometric center of each of the first plurality of roller elements, wherein an open axial gap is defined directly between the raceway rib and an outer circumference of the inner race along an axial length of the raceway rib defined between the first and second outer raceway walls.

2. The pitch bearing of claim 1, wherein the center of curvature for each of the first inner raceway wall and the first outer raceway wall is offset from the geometric center of each of the first plurality of roller elements by a distance ranging from about 0.1 mm to about 5 mm.

3. The pitch bearing of claim 1, wherein each of the second inner and outer raceway walls define a curved profile having a center of curvature, wherein the center of curvature for each of the second inner raceway wall and the second outer raceway wall is offset from the geometric center of each of the second plurality of roller elements.

4. The pitch bearing of claim 1, wherein a lubrication port is defined through the outer race, the lubrication port configured to supply a lubricant from a location outside the pitch bearing to a location between the first and second plurality of roller elements.

5. The pitch bearing of claim 4, wherein the lubrication port is defined within the raceway rib such that the lubricant is supplied through the outer race and into the open axial gap.

6. The pitch bearing of claim 1, wherein a first gap is defined between the inner and outer races along an upper portion of the pitch bearing and a second gap is defined between the inner and outer races along a lower portion of the pitch bearing, further comprising a first sealing mechanism disposed within the first gap directly between the inner and outer races and a second sealing mechanism disposed within the second gap directly between the inner and outer races.

7. The pitch bearing assembly of claim 1, wherein each of the first plurality of roller elements defines an outer contact point with the first outer raceway wall and an inner contact point with the first inner raceway wall, the inner and outer contact points being aligned along a reference line defining a contact angle ranging from about 15 degrees to about 85 degrees.

8. The pitch bearing of claim 1, wherein the raceway rib extends radially inwardly relative to the reference line such that an angle is defined between the reference line and a radially inner end of the raceway rib that ranges from greater than 0 degrees to about 60 degrees.

9. The pitch bearing of claim 1, wherein the open axial gap extends radially along an entire radial distance defined between the raceway rib and the outer circumference of the inner race.

10. A pitch bearing for coupling a rotor blade to a hub of a wind turbine, the pitch bearing comprising:
an outer race configured to be coupled to the hub, the outer race defining a first outer raceway wall and a second outer raceway wall;
an inner race rotatable relative to the outer race and configured to be coupled to the rotor blade, the inner race defining a first inner raceway wall and a second inner raceway wall, the inner race being at least partially spaced apart from the outer race such that a first gap is defined as extending from the inner race to the outer race along an upper portion of the pitch bearing and a second gap is defined as extending from the inner race to the outer race along a lower portion of the pitch bearing
a first plurality of roller elements disposed between the first inner and outer raceway walls and a second plurality of roller elements disposed between the second inner and outer raceway walls;
a raceway rib extending between the first and second plurality of roller elements such that an axial gap is defined between the first and second plurality of roller elements along an axial direction of the pitch bearing, the raceway rib forming an extension of the outer race;
a first sealing mechanism extending fully across the first gap so as to seal the first gap and a second sealing mechanism extending fully across the second gap so as to seal the second gap; and
a lubrication port defined through the outer race so as to extend through the raceway rib, the lubrication port configured to supply a lubricant from a location outside the pitch bearing to a location within the axial gap defined between the first and second plurality of roller elements.

11. The pitch bearing of claim 10, wherein each of the first inner and outer raceway walls defines a curved profile having a center of curvature and each of the first plurality of roller elements defines a geometric center, wherein the center of curvature for each of the first inner raceway wall and the first outer raceway wall is offset from the geometric center of each of the first plurality of roller elements.

12. The pitch bearing of claim 10, wherein each of the first plurality of roller elements defines an outer contact point with the first outer raceway wall and an inner contact point with the first inner raceway wall, the inner and outer contact points being aligned along a reference line defining a contact angle ranging from about 15 to about 85.

13. The pitch bearing of claim 10, wherein each of the first plurality of roller elements defines a geometric center and each of the second plurality of roller elements defines a geometric center, wherein the raceway rib extends radially inwardly from the outer race to a radial location located radially inwardly relative to a reference line extending directly between the geometric centers of each of the first and second plurality of roller elements.

14. The pitch bearing of claim 13, wherein the raceway rib extends radially inwardly relative to the reference line such that an angle is defined between the reference line and a radially inner end of the raceway rib that ranges from greater than 0 degrees to about 60 degrees.

15. The pitch bearing of claim 10, wherein the axial gap corresponds to an open axial gap defined directly between the raceway rib and an outer circumference of the inner race along an axial length of the raceway rib defined between the first and second outer raceway walls.

16. A pitch bearing for coupling a rotor blade to a hub of a wind turbine, the pitch hearing comprising:
an outer race configured to be coupled to the hub, the outer race defining a first outer raceway wall and a second outer raceway wall, the first outer raceway wall defining a curved profile having a center of curvature;
an inner race rotatable relative to the outer race and configured to be coupled to the rotor blade, the inner race defining a first inner raceway wall and a second inner raceway wall, the first inner raceway wall defining a curved profile having a center of curvature;

a first plurality of roller elements disposed between the first inner and outer raceway walls, each of the first plurality of roller elements defining a geometric center;

a second plurality of rollers disposed between the second inner and outer raceway walls, each of the second plurality of roller elements defining a geometric center; and a raceway rib extending between the first and second plurality of roller elements, the raceway rib forming an extension of the outer race and separating the first outer raceway wall from the second outer raceway wall, the raceway rib extending radially inwardly from the outer race to a radial location located radially inwardly relative to a reference line extending directly between the geometric centers of each of the first and second plurality of roller elements, wherein the center of curvature for each of the first inner raceway wall and the first outer raceway wall is offset from the geometric center of each of the first plurality of roller elements, wherein an open axial gap is defined directly between the raceway rib and an outer circumference of the inner race along an axial length of the raceway rib defined between the first and second outer raceway walls, wherein the raceway rib extends radially inwardly relative to the reference line such that an angle is defined between the reference line and a radially inner end of the raceway rib that ranges from greater than 0 degrees to about 60 degrees.

17. The pitch bearing of claim 16, wherein the angle ranges from about 15 degrees to about 45 degrees.

18. The pitch bearing of claim 16, wherein a lubrication port is defined through the outer race, the lubrication port configured to supply a lubricant from a location outside the pitch bearing to a location between the first and second plurality of roller elements.

19. The pitch bearing of claim 16, wherein the open axial gap extends radially along an entire radial distance defined between the raceway rib and the outer circumference of the inner race.

20. The pitch bearing of claim 16, wherein a first gap is defined between the inner and outer races along an upper portion of the pitch bearing and a second gap is defined between the inner and outer races along a lower portion of the pitch bearing, further comprising a first sealing mechanism disposed within the first gap directly between the inner and outer races and a second sealing mechanism disposed within the second gap directly between the inner and outer races.

* * * * *